Dec. 30, 1952   J. KURSHAN   2,624,038
VOLTAGE REGULATOR SYSTEM
Filed April 12, 1949

Inventor
Jerome Kurshan
By Conder C. Henry
Attorney

Patented Dec. 30, 1952

2,624,038

UNITED STATES PATENT OFFICE 2,624,038

VOLTAGE REGULATOR SYSTEM

Jerome Kurshan, Princeton, N. J., assignor to Radio Corporation of America, a corporation of Delaware Application April 12, 1949, Serial No. 86,908

6 Claims. (Cl. 323—20)

My invention relates to voltage regulators and more particularly to electronic voltage regulator systems.

In certain applications of electronic voltage regulators to direct current loads, it is important that the regulator maintain a substantially constant potential across the load, even when the load has a negative resistance characteristic, as, for example, in the dynatron when the secondary emission electrons leaving the plate exceed the electrons entering it. There have been provided, heretofore, bleeder circuits that will draw sufficient current through the regulator to enable the regulator to function even when the load current drops to zero. However, these bleeder circuits are usually resistors connected either in parallel with the load or in parallel with the regulator. It is obvious that this type of bleeder will not be able to draw sufficient current when the load is supplying a substantial reverse current as in the dynatron previously mentioned. In such cases the bleeder must draw all of the dynatron current plus sufficient current to maintain the action of the regulator.

This arrangement is further objectionable in that the bleeder draws substantial current whenever the regulator is functioning, thus reducing the efficiency of the power supply system.

It is an object of my invention to provide a voltage regulator system that will maintain a substantially constant output voltage irrespective of the impedance characteristics of the load being supplied thereby.

It is a further object of my invention to provide a bleeder circuit for an electronic voltage regulator system that will draw sufficient current to enable the regulator to function even when the load is supplying a reverse current.

Still another object is the provision of a bleeder circuit for electronic voltage regulator system that draws negligible current when the load is drawing normal positive current; and draws increasing current as the load current decreases below that value which would sustain the operation of the regulator.

By way of summary, my invention may be described, in general language, as an electronic voltage regulating system in which a conventional electronic regulator is used to control the output of an unregulated source of potential supplying a load device but distinguished in that an electronic amplifier is used as a bleeder across the output of the regulator. Suitable control potential is automatically applied to the amplifier so that the bleeder draws negligible current when the load is drawing normal positive current. However, when conditions are such that the load device supplies a reverse current to the power supply, the bleeder will draw sufficient additional current to enable the regulator to function properly. The control potential for the amplifier is obtained by means utilizing the current flowing through a resistor connected in series between the load and the unregulated source of potential.

A better understanding of my invention may be had from the following description taken in conjunction with the accompanying drawings in which.

Figure 1:
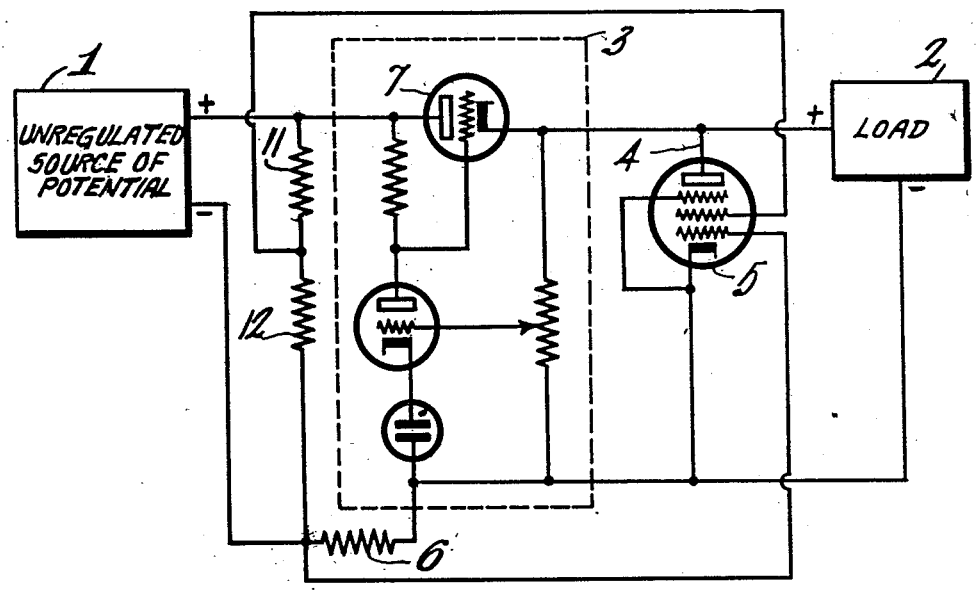
Fig. 1 represents one embodiment of my invention.

Referring to Fig. 1 I have provided a source of unregulated potential 1 and a load 2. Connected between the source of potential and the load is an electronic voltage regulator, shown in dotted block 3. Across the output of the regulator is connected a bleeder circuit 4, including an amplifier 5. In the return lead from the load to the unregulated source of potential a line resistor 6 has been connected in series. The potential developed in this resistor by the current flowing therethrough is utilized to control the flow of electrons through the amplifier in the bleeder circuit.

In operation, the regulator controls the potential across the load by controlling the current supplied to the load. This control is effected by the tube 7 of the regulator. In bleeders of the conventional resistor type, insufficient current would be bled off to maintain the action of the regulator if the load should start supplying reverse current, for example through dynatron effect. In my invention a negligible current is drawn through the bleeder during normal operation because the current through the load is returned to the unregulated source through the series line resistor 6. The potential difference across this resistor, due to the current flowing through it, is applied as bias to the control element of the amplifier, thus substantially preventing a flow of current through the bleeder. When the current through the load, and hence through the resistor 6 is reduced, thereby reducing the bias on the amplifier, more bleeder current is permitted to flow. Thus, when the load supplies a reverse current, a minimum of current is flowing through the line resistor 6, causing a minimum of bias to be applied to the control element of the amplifier 5 in the bleeder circuit. This amplifier is so chosen that under these conditions the bleeder is able to conduct the maximum anticipated reverse current from the load plus such current as is required to maintain the operation of the regulator.

That portion of the bleeder current which represents the reverse current from the load is returned to the load and therefore has no effect on the potential difference across the line resistor 6, but that portion which represents the current drawn through the regulator is returned to the unregulated source of potential and thus will attain a state of equilibrium determined by the current drawn through the tube 7 of the regulator.

It is to be noted that the line resistor 6 may be a thyrite or other non-linear resistance element which has the proper resistance at that value of current required to maintain the operation of the regulator, but drops off rapidly as the voltage across it rises. This would mean that the resistance would be high when the internal resistance of the regulator is high, and low when the internal resistance of the regulator is low.

Figure 2:
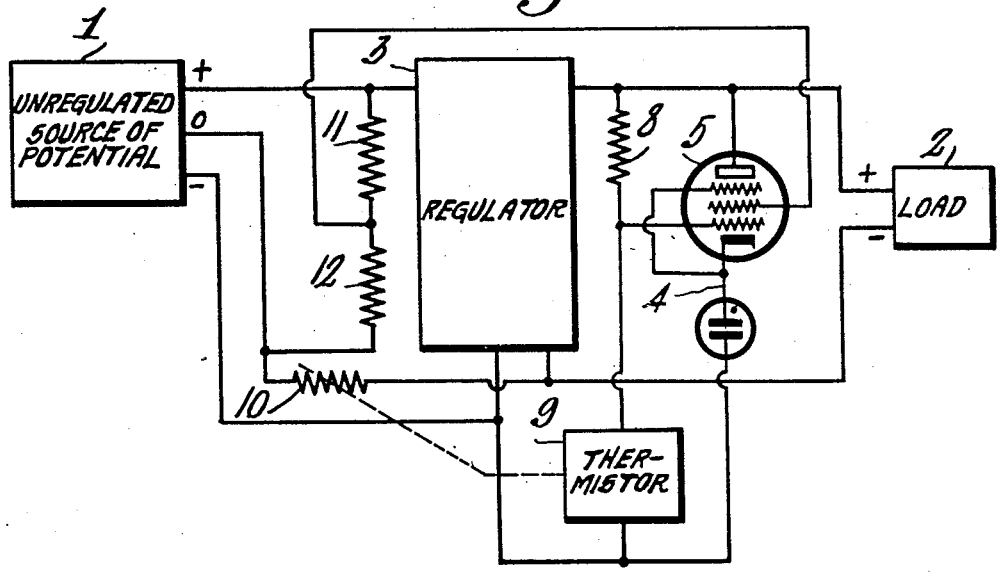
Fig. 2 shows a modification of my invention.

The circuit of Fig. 2 differs from that of Fig. 1 in that regulated output voltages down to zero volts may be obtained which is not possible in the circuit of Fig. 1. In Fig. 2 the unregulated source of potential 1 is provided having a positive and a suitably stabilized negative supply, and a zero potential load return lead. The load 2 is connected between the positive supply and the zero return lead. The regulator is inserted in the positive and zero potential leads and also returned to the negative supply. The regulator is of such a type that output voltages down to zero volts can be obtained with normal positive loads. The bleeder circuit 4, including amplifier 5, is connected between the regulator output and the negative supply lead. A potential divider is arranged between the output of the regulator and the negative supply lead comprising a resistor 8 and an externally heated thermistor 9. The thermistor is a resistor that has a negative temperature characteristic, that is the resistance of the thermistor is decreased as its temperature is increased. The center tap of this potential divider is connected to the control element of the amplifier 5 in the bleeder circuit.

The line resistor 10 corresponds to the line resistor 6 of Fig. 1, but differs in that in this circuit the resistor 10 is a heater which provides changes in temperature for the thermistor 9 in response to changes in the current flowing through the load 2.

The operation of the circuit of Fig. 2 is similar to that of Fig. 1. When normal positive current is flowing through the load, the current is returned to the unregulated source by the zero potential load return lead through the line resistor 10; thus heating the resistor and hence the thermistor 9, reducing the resistance of the thermistor which in turn renders the bias potential on the control element of the amplifier 5 sufficiently negative to reduce the current flow through the bleeder circuit to a negligible amount. As before, when the load is supplying reverse current, a minimum of current is flowing through the load return lead, and hence through the line resistor 10. Therefore the temperature of the resistor and of the thermistor is reduced, increasing the resistance of the thermistor and hence the bias potential on the control element of the bleeder circuit amplifier 5. Again the elements of the circuit are so chosen that, at this value of bias potential on the control element of the amplifier, the bleeder circuit is able to draw the maximum anticipated reverse current from the load plus the minimum current required to maintain the operation of the regulator.

If, in either of the circuits, it is desired to have an adjustable output voltage from the regulator, as is indicated by the use of the rheostat in the regulator of Fig. 1, a change in the voltage across the bleeder circuit will cause a change in the operating characteristics of the amplifier therein if such amplifier is a triode. However, by using a pentode for the amplifier in the bleeder circuit this change in the operating characteristics is sufficiently small to render it negligible. The potential for the screen grid is obtained from a potential divider across the unregulated source. The potential divider consists of resistors 11 and 12. By obtaining the screen grid supply in this manner, the potential on the screen is unaffected by a change in the regulator output voltage, thus causing the amplifier's operating characteristic to be substantially unchanged.

It is to be understood that, while I have thus described my invention, many modifications will be obvious to those skilled in the art that do not depart from the spirit and scope thereof.

What I claim is:

1. In a voltage regulator system, a source of unregulated potential, a load, adjustable electronic regulating means connected to said source, the output of said regulating means connected to said load, a bleeder circuit connected to draw current through said regulating means, said bleeder circuit including an electronic discharge device having a cathode, an anode, a control grid and a screen grid, a return lead from said load to said source, a resistance element connected in series in said return lead, a connection whereby the potential developed across said resistance element controls the bias between said cathode and control grid, and means applying a portion of the unregulated potential from said source to said screen grid.

2. In a voltage regulator system, a source of unregulated potential having a positive and negative potential point, a load, electronic regulating means connected between said load and said source of potential, a return lead from said load to said source, a resistance element connected in series in said load return lead, a return lead from said regulating means to said source, a bleeder circuit connected between the output of said regulating means and the negative potential point of said source, said bleeder circuit including a controlled electron device having a cathode, an anode, a control grid, and a screen grid, means utilizing the current through said resistance element to control the current drawn by said bleeder circuit, and means applying a portion of the unregulated potential from said source to said screen grid.

3. In a voltage regulator system, a source of unregulated potential having a positive and negative potential point, a load, electronic regulating means connected between said load and said source, a return lead from said load to said source, a resistance element connected in series in said load return lead, a return lead from said regulating means to said source, a bleeder circuit connected between the output of said regulating means and the negative potential point of said source, said bleeder circuit including a controlled electron device having a cathode, an anode, a control grid and a screen grid, means applying a portion of the unregulated potential from said source to said screen grid, means utilizing the heat generated in said resistance element by current flowing therethrough to control the current drawn by said bleeder circuit.

4. In a voltage regulator system, a source of unregulated potential having a positive and negative potential point, a load, electronic regulating means connected between said load and said source, a return lead from said load to said source, a resistance element connected in series in said load return lead, a return lead from said regulating means to said source, a bleeder circuit connected between the output of said regulating means and the negative potential point of said source, said bleeder circuit including an electronic discharge device having a cathode, an anode and a control grid, a variable potential divider across said bleeder circuit, a thermistor in said potential divider providing the variable element thereof, the temperature of said thermistor being governed by the heat generated by current flowing through said resistance element in said load return lead, a connection applying the thus divided potential as bias between said control grid and said cathode to control the current drawn by said bleeder circuit.

5. In a voltage regulator system, a source of unregulated potential having a positive and negative point, a load, adjustable electronic regulating means connected between said load and said source, a return lead from said load to said source, a resistance element connected in series in said load return lead, a return lead from said regulating means to said source, a bleeder circuit connected between the output of said regulating means and the negative potential point of said source, said bleeder circuit including an electronic discharge device having a cathode, an anode, a screen grid and a control grid, a variable potential divider across said bleeder circuit, a thermistor in said potential divider providing the variable element thereof, the temperature of said thermistor being governed by the heat generated by current flowing through said resistance element in said load return lead, a connection applying the thus divided potential as bias between said control grid and said cathode to control the current drawn by said bleeder circuit, means applying a portion of the unregulated potential from said source to said screen grid.

6. In a voltage regulator system having input and output terminals, an adjustable electronic regulating means connected in series between one of said input terminals and one of said output terminals, a bleeder circuit connected to draw current through said regulating means, said bleeder circuit including an electronic control device having a cathode, a control electrode and an output electrode, said output electrode being connected to said one of said output terminals, a resistance connected in series between the other of said output terminals and the other of said input terminals, and means whereby the potential developed across said resistance controls the potential applied to said control electrode.

JEROME KURSHAN.

REFERENCES CITED

The following references are of record in the file of this patent:

UNITED STATES PATENTS

| Number | Name | Date |
|---|---|---|
| 2,475,613 | Hastings | July 12, 1949 |
| 2,519,377 | Jenkins | Aug. 22, 1950 |

FOREIGN PATENTS

| Number | Country | Date |
|---|---|---|
| 472,326 | Great Britain | Sept. 22, 1937 |

OTHER REFERENCES

Publication, "Analysis of Voltage-Regulator Operation," by W. R. Hill, Jr., vol. 33, No. 1, pages 38–45 (January 1945) in the Proceedings of the I. R. E.